United States Patent
Zhang et al.

(10) Patent No.: US 12,170,708 B2
(45) Date of Patent: Dec. 17, 2024

(54) DATA SYNCHRONIZATION METHOD AND APPARATUS

(71) Applicant: Huawei Technologies Co., Ltd., Shenzhen (CN)

(72) Inventors: Xudong Zhang, Beijing (CN); Peng Zhang, Beijing (CN); Rong Jiang, Beijing (CN); Shenzu Qin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/531,114

(22) Filed: Nov. 19, 2021

(65) Prior Publication Data
US 2022/0166829 A1    May 26, 2022

(30) Foreign Application Priority Data
Nov. 20, 2020 (CN) .......................... 202011312034.6

(51) Int. Cl.
*H04L 12/28*    (2006.01)
*G05B 19/418*   (2006.01)
(Continued)

(52) U.S. Cl.
CPC .......... *H04L 67/1095* (2013.01); *H04L 45/02* (2013.01); *H04L 45/44* (2013.01); *H04L 67/63* (2022.05)

(58) Field of Classification Search
CPC ..... H04L 67/1095; H04L 45/22; H04L 65/80; H04L 45/02; H04L 67/2852; H04L 45/44; H04L 67/327; H04L 67/63; H04L 67/51; H04L 69/40; H04L 67/1097; H04L 2201/815; H04L 67/5682; G06F 11/1484; G06F 9/45533; G06F 9/546; G06F 9/547; G06F 16/27; G06F 11/2097; G06F 2201/815; G06F 9/52; G06F 2209/544;
(Continued)

(56) References Cited

U.S. PATENT DOCUMENTS 7,912,075 B1 * 3/2011 Holland ................. H04L 65/80
370/216
2006/0069946 A1 * 3/2006 Krajewski ........... G06F 11/1658
714/4.1
(Continued)

FOREIGN PATENT DOCUMENTS

CN    101038591 A    9/2007
CN    102073742 A *  5/2011
(Continued)

*Primary Examiner* — Edan Orgad
*Assistant Examiner* — Vanneilian Lalchinthang
(74) *Attorney, Agent, or Firm* — Conley Rose, P.C.

(57) ABSTRACT

A data synchronization method and apparatus, applied to a first data service module. The method includes receiving a first request from a second service module, where the first request is used to request to synchronize service data of a first service module; obtaining the service data of the first service module; and sending the service data of the first service module to the second service module. In solutions provided in the present disclosure, the first data service module replaces the first service module to synchronize the service data of the first service module for the second service module.

16 Claims, 10 Drawing Sheets

(51) Int. Cl.
    *H04L 29/08*    (2006.01)
    *H04L 45/02*    (2022.01)
    *H04L 45/44*    (2022.01)
    *H04L 67/1095*    (2022.01)
    *H04L 67/63*    (2022.01)

(58) Field of Classification Search
    CPC .......... G06F 2209/547; G05B 19/4184; G05B 19/4185; Y02P 90/02
    USPC .......................................................... 370/392
    See application file for complete search history.

(56) References Cited

U.S. PATENT DOCUMENTS

| | | | | |
|---|---|---|---|---|
| 2007/0130217 A1* | 6/2007 | Linyard | ................. | G06F 16/275 |
| 2007/0180311 A1* | 8/2007 | Harvey | ................... | H04L 45/58 |
| | | | | 714/13 |
| 2007/0300234 A1* | 12/2007 | Dekel | ................. | H04L 12/1868 |
| | | | | 719/313 |
| 2009/0019161 A1* | 1/2009 | Li | ...................... | H04N 7/17318 |
| | | | | 709/226 |
| 2020/0280615 A1* | 9/2020 | Andersson | ............ | H04L 67/125 |
| 2021/0083928 A1* | 3/2021 | Zheng | ................. | H04L 41/0663 |
| 2021/0352158 A1* | 11/2021 | Andersson | .......... | H04L 67/5682 |

FOREIGN PATENT DOCUMENTS

| | | | | | |
|---|---|---|---|---|---|
| CN | 104158693 | A | | 11/2014 | |
| CN | 104601347 | A | | 5/2015 | |
| CN | 110535714 | A | | 12/2019 | |
| CN | 110958176 | A | | 4/2020 | |
| CN | 111600958 | A | * | 8/2020 | ............. G06F 16/27 |
| CN | 111638970 | A | | 9/2020 | |
| CN | 111651526 | A | | 9/2020 | |
| EP | 3702857 | A1 | | 9/2020 | |
| WO | 2015090027 | A1 | | 6/2015 | |

\* cited by examiner

DATA SYNCHRONIZATION METHOD AND APPARATUS

CROSS-REFERENCE TO RELATED APPLICATION

This application claims priority to Chinese Patent Application No. 202011312034.6, filed on Nov. 20, 2020, which is hereby incorporated by reference in its entirety.

TECHNICAL FIELD

The present disclosure relates to the field of communications technologies, and in particular, to a data synchronization method and apparatus.

BACKGROUND

When control plane software is deployed in an existing routing system, an active/standby redundancy manner can be used. Fault protection can by performed on the routing system by deploying an active program and a standby program. The standby program functions as a redundancy backup of the active program, and the active program directly synchronizes data to the standby program, to cooperate with the standby program to go online. When the active program is faulty, the standby program takes over a work of the active program, to avoid or reduce a service loss and ensure normal running of the routing system. However, frequently synchronizing the data from the active program to the standby program occupies a large quantity of resources. Therefore, service processing performance of the active program is affected, and performance of the active program is deteriorated.

SUMMARY

The present disclosure provides a data synchronization method and apparatus. This helps reduce impact on performance in a data synchronization process.

According to a first aspect, a data synchronization method is provided, where the method is applied to a first data service module. The method includes receiving a first request from a second service module, where the first request is used to request to synchronize service data of a first service module; obtaining the service data of the first service module; and sending the service data of the first service module to the second service module.

In the method, the first data service module receives the request from the second service module, obtains the service data of the first service module, and sends the service data to the second service module. In this way, data synchronization between the second service module and the first service module can be implemented while resources of the first service module are hardly occupied. Therefore, this avoids and reduces impact of a data synchronization process on performance, and ensures performance of the first service module. When the first service module is an active service module, after synchronizing data with the first service module, the second service module may serve as a backup of the first service module, and take over the first service module after the first service module is faulty. This implements service processing continuity.

In a possible design, the first service module is an active service module, and the second service module is a standby service module.

In a possible design, the method further includes receiving a second request from a third service module, where the second request is used to request to synchronize the service data of the first service module; and sending the service data of the first service module to the third service module.

In the method, the first data service module may synchronize the service data of the first service module for a plurality of service modules based on requests of the plurality of service modules, for example, the requests sent by the second service module and the third service module. Therefore, this can deploy a plurality of standby service modules for the first service module, to implement multipoint fault protection, increase a fault tolerance rate, and improve fault protection performance.

In a possible design, the third service module is a standby service module of the active service module.

In a possible design, the second service module switches to an active service module after the first service module is faulty, the first service module recovers from a faulty state to a normal state, and the method further includes receiving a third request from the first service module, where the third request is used to request to synchronize service data of the second service module; obtaining the service data of the second service module; and sending the service data of the second service module to the first service module.

In the method, when the first service module is faulty, the second service module can switch to the active service module, to take over the first service module to process a service. Therefore, this ensures the service processing continuity, and reduces a service loss caused by a fault. After the second service module switches to the active service module, and after a fault of the first service module is rectified, the first service module may further synchronize data with the second service module, to continue to provide a service for service processing.

In a possible design, before the obtaining the service data of the first service module, the method further includes obtaining first service data and an identifier of the first service data, where the identifier of the first service data is used to indicate a sequence of obtaining the first service data, and the first service data is the service data of the first service module; and storing the first service data and the identifier of the first service data. The identifier of the first service data may be an identifier corresponding to a moment of obtaining the first service data, such as a version number or a sequence number.

In the method, by storing the first service data and the identifier of the first service data, the first data service module can quickly find the first service data based on the identifier, and improve a data processing speed.

In a possible design, before the obtaining the service data of the first service module, the method further includes obtaining second service data and an identifier of the second service data, where the identifier of the second service data is used to indicate a sequence of obtaining the second service data; storing the second service data and the identifier of the second service data; obtaining first service data and an identifier of the first service data, where the identifier of the first service data is used to indicate a sequence of obtaining the first service data, the first service data is obtained later than the second service data, and both the first service data and the second service data are the service data of the first service module; and storing the first service data and the identifier of the first service data. The identifier of the first service data and the identifier of the second service data may be used to indicate that the first service data is obtained later than the second service data, and a magnitude relationship between the identifier of the first service data and the identifier of the second service data may be set based on a requirement.

In the method, the second service data may be stored historical service data of the first service module, the first service data may be stored latest service data of the first service module, and the first data service module can perform corresponding processing based on an identifier corresponding to service data. This improves data processing efficiency.

In a possible design, the obtaining the service data of the first service module includes obtaining, based on a sequence of obtaining the service data of the first service module, the first service data corresponding to the identifier of the first service data.

In a possible design, the obtaining the service data of the first service module includes obtaining, based on a key included in the service data of the first service module, service data including a same key, where the service data including the same key includes the first service data; and obtaining, based on a sequence of obtaining the service data of the first service module, the first service data corresponding to the identifier of the first service data.

In the method, the first data service module can perform processing such as filtering and updating on the service data based on keys of service data, and only retain latest-version service data corresponding to the same key. Therefore, this can avoid data redundancy and save storage space.

In a possible design, the first service module corresponds to the first data service module, and the first service module and the first data service module are deployed in a same object; or the first service module corresponds to the first data service module, and the first service module and the first data service module are deployed in different objects.

In a possible design, the first service module corresponds to the first data service module, and the first data service module and a data service module corresponding to the second service module are deployed in a same object; or the first service module corresponds to the first data service module, and the first data service module and a data service module corresponding to the second service module are deployed in different objects.

In a possible design, the object includes an application process, a container, a virtual machine, a server, or an electronic device.

According to a second aspect, a data synchronization apparatus is provided, including units configured to support implementation of functions corresponding to the steps included in any one of the first aspect or the possible designs of the first aspect.

According to a third aspect, the present disclosure provides a data synchronization apparatus. The data synchronization apparatus includes a memory and one or more processors. The memory is configured to store computer program code, and the computer program code includes computer instructions. When the computer instructions are executed by the processor, the data synchronization apparatus is enabled to perform the method described in any one of the first aspect or the possible designs of the first aspect.

According to a fourth aspect, an embodiment of the present disclosure provides a data synchronization system, including a first service module, a second service module, and the data synchronization apparatus provided in the second aspect or the third aspect.

In a possible design, the data synchronization system further includes a third service module.

According to a fifth aspect, an embodiment of the present disclosure provides a chip. The chip is coupled to a memory in an electronic device, so that when running, the chip invokes a computer program stored in the memory, to implement the method described in any one of the first aspect or the possible designs of the first aspect.

According to a sixth aspect, an embodiment of the present disclosure provides a computer storage medium. The computer storage medium stores a computer program, and when the computer program is run on an electronic device, the electronic device is enabled to perform the method described in any one of the first aspect or the possible designs of the first aspect.

According to a seventh aspect, an embodiment of the present disclosure provides a computer program product. When the computer program product is run on an electronic device, the electronic device is enabled to perform the method described in any one of the first aspect or the possible designs of the first aspect.

For beneficial effects of the second aspect to the seventh aspect, refer to the description of beneficial effects of the first aspect.

DESCRIPTION OF EMBODIMENTS

Figure 1:
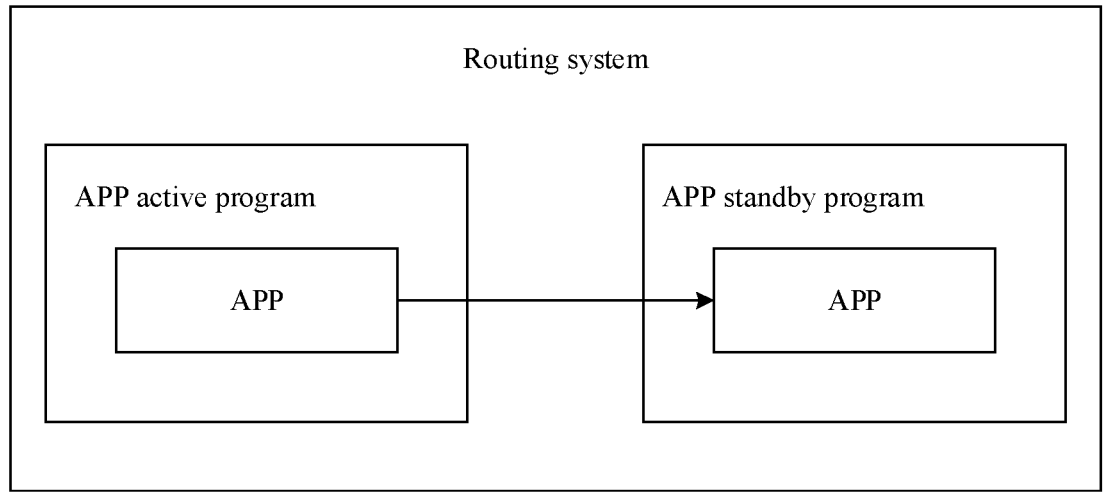
FIG. 1 is a schematic diagram of deploying control plane software on a routing device in an active/standby manner according to an embodiment of the present disclosure.

To make objectives, technical solutions and advantages of embodiments of the present disclosure clearer, the following further describes the embodiments of the present disclosure in detail with reference to the accompanying drawings. In the descriptions of the embodiments of the present disclosure, the terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features.

For ease of understanding, descriptions of concepts related to the present disclosure are provided as examples for reference, and details are as follows (1) A routing device is a network device having a route management function, for example, a network device having functions such as receiving and distributing a route and routing. For example, the routing device may be a router, or the routing device includes a plurality of logical function units. This is not limited in the present disclosure. A system used to implement a routing function may be referred to as a routing system on the routing device.

In a routing protocol, the routing device includes a control plane and a forwarding plane (also referred to as a data plane). The control plane is responsible for controlling and managing running of the routing protocol. The forwarding plane is responsible for processing and forwarding routing data. When control plane software (also referred to as a program or an application (APP) in the embodiments of the present disclosure) of the routing device is deployed in the routing system, high reliability and high availability of control plane software of the routing protocol are key attributes of the routing device.

(2) Non-stop routing (NSR) In a routing system, a protocol backup mechanism is used to ensure that a control plane and a forwarding plane are not interrupted during an active/standby switchover. An internal mechanism is used to ensure that a routing protocol status and a neighbor relationship status are consistent between active and standby control planes, without support of a neighbor.

(3) Non-stop forwarding (NSF) In a routing system, a graceful restart (GR) update mechanism of a routing protocol is used to ensure that a forwarding service is not interrupted during an active/standby switchover in the system. This can keep packets transmitted normally when a routing processor is interrupted, to reduce impact of an interruption on a network.

Generally, when control plane software is deployed on a routing device, a single active control deployment manner or an active/standby deployment manner is used. In the single active control deployment manner, only one active program is deployed on a control plane of the routing device to execute functions related to route management. When the active program is faulty, the active program needs to be restarted to recover. Therefore, a service loss is easily caused and normal running of the routing device is affected.

FIG. 1 is a schematic diagram of deploying control plane software by a routing device in an active/standby manner. As shown in FIG. 1, in the active/standby deployment manner, a routing system including an active program and a standby program of the active program is deployed on a control plane of a routing device. In the routing system, the standby program performs service processing the same as that of the active program in a background. After the active program is faulty, the standby program takes over a work of the active program based on an NSR or NSF manner, to implement a non-interruption or a temporary interruption of a service, and avoid or reduce a service loss. This deployment manner can protect reliability only in case of a single point of failure. In other words, this manner can ensure that the routing system run normally when only the active program is faulty. However, when both the active and standby programs are faulty, the service loss may still be caused, affecting normal running of the routing system. Therefore, this manner does not support protection in case of a multi-point fault, and provides a relatively weak fault protection capability for the routing system.

Based on the foregoing problems, an embodiment of the present disclosure provides a data synchronization method. In the method, a first data service module may send service data of a first service module to a second service module based on a data synchronization request of the second service module that serves as a backup. In this way, after the first service module that serves as an active service module is faulty, the second service module obtains the service data that exists before the first service module is faulty, to ensure service continuity without deteriorating performance.

In some embodiments of the present disclosure, the first data service module corresponds to the first service module, and the first data service module and the first service module are deployed in an embedded router or switch, or are deployed in a cloud-based or virtualized routing/switching system.

In some embodiments of the present disclosure, in an optional implementation, in a process of deploying control plane software, a plurality of same initialization applications is initially deployed, and an application that is started first in the plurality of initialization applications may be used as an active program to provide a service externally, and another standby program is used as a standby program of the active program. In a running process of the active program, a new standby program may also continue to be deployed for the active program. In another optional implementation, in a process of deploying the control plane software, an active program used to provide a service externally is first deployed, and then a plurality of standby programs may be sequentially deployed for the active program in a running process of the active program. In the running process of the active program, when the standby program is deployed for the active program, the active program has generated a part of service data. Therefore, the part of data needs to be synchronized to a newly deployed standby program, to ensure consistency between the service data of the standby program and the service data of the active program. After obtaining the part of data, the standby program completes synchronization with the active program, to go online as a standby program of the active program, takes over the service of the primary program when the primary program is faulty.

In some embodiments of the present disclosure, when the active program synchronizes the service data to the standby program, data synchronization may be performed in any one of the following implementations (1) The active program directly synchronizes the service data to the plurality of standby programs.

In the plurality of standby programs, when the standby programs go online, the active program directly synchronizes the service data to the standby programs. After synchronization is completed, the standby programs go online, serving as the standby programs of the active program, and subsequently perform an operation exactly the same as that of the active program, to ensure consistency with the active program.

(2) The active program synchronizes the service data to the plurality of standby programs by using a database.

During service processing, the active program stores the generated service data to the database, and the database stores a plurality of copies of the service data of the active program. This improves data availability. In the plurality of standby programs, when the standby programs go online, the standby programs read copy data from the database, perform data synchronization and go online, serve as the standby programs of the active program, and subsequently perform an operation exactly the same as that of the active program, to ensure consistency with the active program.

An embodiment of the present disclosure further provides a data synchronization method, to resolve a problem that performance of the active program deteriorates because the active program synchronizes the service data to the standby program when the standby program goes online.

The active program in this embodiment of the present disclosure may be an active service module that provides service processing. The standby program in this embodiment of the present disclosure may be a standby service module and that provides service processing or a service module that serves as a backup and that provides service processing.

To facilitate understanding of the data synchronization method provided in the present disclosure, an application scenario of the data synchronization method is first described.

Figure 2:
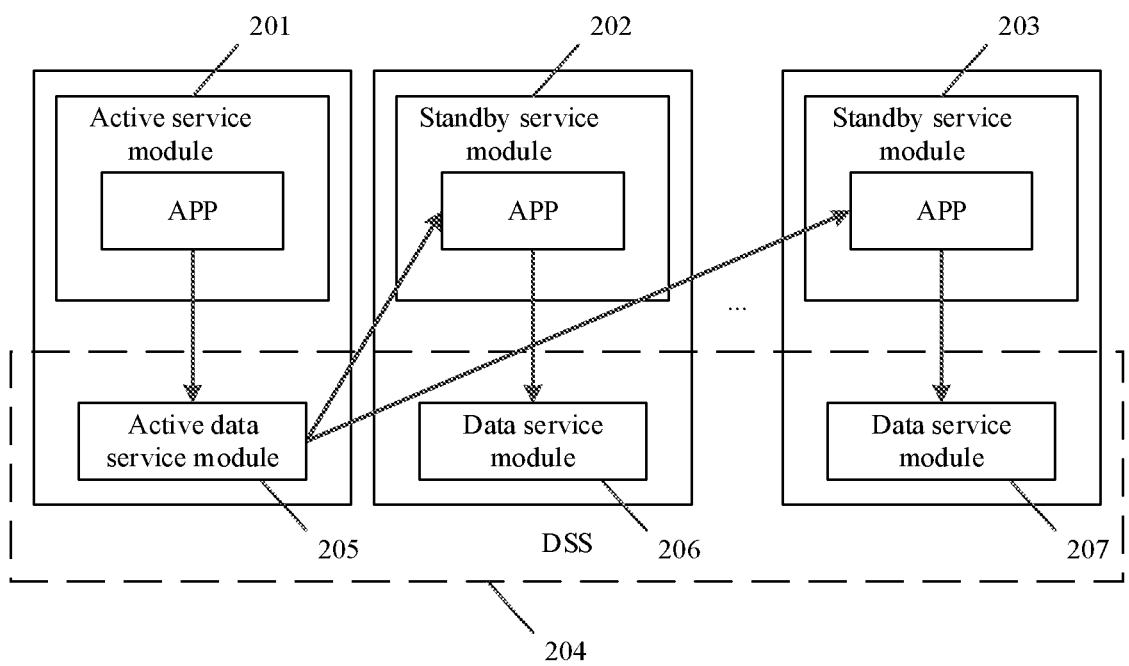
FIG. 2 is a schematic diagram of an architecture of a data synchronization system according to an embodiment of the present disclosure.

FIG. 2 shows a schematic diagram of an architecture of a data synchronization system according to the present disclosure. As shown in FIG. 2, the system includes at least an active service module 201, a plurality of standby service modules of the active service module such as a standby service module 202 and a standby service module 203 shown in FIG. 2, and a data synchronization service (DSS) module 204. The DSS module 204 includes at least an active data service module 205. The active service module 201 is configured to provide a service externally, and the DSS module 204 is configured to provide a service data storage function for the service modules. The active data service module 205 in the DSS module 204 is configured to store service data generated by the active service module 201.

The DSS module 204 may further include a plurality of data service modules respectively corresponding to the plurality of standby service modules, for example, a data service module 206 corresponding to the standby service module 202 and a data service module 207 corresponding to the standby service module 203 shown in FIG. 2. The plurality of data service modules is respectively configured to store service data of the plurality of standby service modules. A service module corresponds to a data service module. Each data service module is configured to store service data of a service module corresponding to the data service module.

In this embodiment of the present disclosure, the active data service module 205 corresponding to the active service module 201 has one or more of a capability of publishing data externally and a capability of subscribing to data externally. After the active service module 201 writes the generated service data into the corresponding active data service module 205, another standby service module may obtain the service data from the active data service module 205, to synchronize the service data from the active service module 201 to the standby service module. Specifically, in a process of processing a service, the active service module 201 sends the generated service data to the active data service module 205, and the active data service module 205 stores the service data. When each of the plurality of standby service modules goes online, the standby service module obtains the service data from the active data service module 205, and goes online after completing data synchronization with the active service module 201. After each of the standby service modules goes online, the standby service module serves as a standby service module of the active service module 201, and synchronously executes a same service processing procedure as that of the active service module 201 in a background. When the active service module 201 is faulty or the active data service module 205 is faulty, the active data service module 205 stops providing data publishing subscription externally. The data synchronization system selects, based on a service priority of each standby service module, one of the standby service modules to switch to a new active service module, to take over service processing of the original active service module 201. A data service module corresponding to the new active service module is updated to a new active data service module, and can provide data publishing/subscription externally. Another standby service module may obtain service data from the new active data service module.

In some embodiments of the present disclosure, the active service module 201 corresponds to the active data service module 205, and the active service module 201 and the active data service module 205 are deployed in a same object. Alternatively, the active service module 201 corresponds to the active data service module 205, and the active service module 201 and the active data service module 205 are deployed in different objects. In some embodiments of the present disclosure, the active service module 201 corresponds to the active data service module 205, and the active data service module 205 and a data service module corresponding to at least one standby service module are deployed in a same object. Alternatively, the active service module 201 corresponds to the active data service module 205, and the active data service module 205 and a data service module corresponding to the at least one standby service module are deployed in different objects. In some embodiments of the present disclosure, the object may be an application process, a container, a virtual machine, a server, an electronic device, or the like; or another object that can deploy the service module or the data service module.

It should be understood that FIG. 2 is an example, and a quantity of standby service modules and data service modules included in the data synchronization system is not specifically limited. The foregoing service modules are logically divided based on functions of the modules. Actually, the functions of each service module are implemented by a device in which the service module is located. It should be noted that different service modules may run on different devices, or a plurality of service modules run on a same device. This is not limited in the present disclosure. For example, the foregoing service modules may separately run on a common server, or may separately run on different servers. The same applies to the foregoing data service modules.

The following describes the data synchronization method provided in the present disclosure with reference to the accompanying drawings. The method provided in this embodiment of the present disclosure may be applied to the data synchronization system shown in FIG. 2.

In the data synchronization method provided in this embodiment of the present disclosure, the service data of the active service module is synchronized to another standby service module by using an active data service module corresponding to the active service module, and different service modules separately correspond to one data service module configured to store service data of the service module. Therefore, in a process of providing a service, each service module needs to send generated service data to the corresponding data service module in real time, and the data service module stores the service data after receiving the service data, to facilitate subsequent synchronization of the service data.

The following uses a first service module and a corresponding first data service module as an example for specific description.

In this embodiment of the present disclosure, a data service module configured to store the service data of the active service module is the active data service module. When the first service module is the active service module, a data service module configured to store service data of the first service module serves as the active data service module, has a capability of publishing data externally, and is configured to synchronize the service data to a newly online standby service module of the first service module.

In a process of processing a service, the first service module sends generated service data to the first data service module in real time, and the first data service module stores the received service data.

In an optional implementation, the first service module sends the generated service data to the first data service module, and when receiving the service data, the first data service module stores the service data based on a time sequence of receiving the service data, and subsequently compares new and old versions of the service data based on a storage sequence or storage moments of the service data.

In another optional implementation, the first service module sends the generated service data to the first data service module, and the first data service module obtains first service data of the first service module and an identifier of the first service data, and stores the first service data and the identifier of the first service data. The identifier of the first service data is used to indicate a sequence of obtaining the first service data.

Specifically, when receiving the first service data sent by the first service module, the first data service module generates the identifier of the first service data based on the time sequence of receiving the service data, and stores the first service data and the identifier of the first service data. Subsequently, new and old versions of the service data may be compared based on the identifier of the service data.

Optionally, after the first data service module stores the first service data, the first service data switches to stored second service data. Therefore, in this embodiment of the present disclosure, it may be considered that the second service data is service data first received and stored by the first data service module, namely, historical service data, and the first service data is service data newly received after the first data service module obtains the second service data.

In some embodiments of the present disclosure, the identifier may be a version number. The first data service module generates a version number corresponding to the first service data in an ascending order of version numbers, and uses the version number as the identifier of the first service data.

In some embodiments of the present disclosure, the first data service module stores the service data in a format of key or a format of key-value (Key-Value). The key is information that identifies each recorded or stored specific data, and is used to uniquely identify a data object. In this embodiment of the present disclosure, the data object is the service data of the first service module, and the value is specific content of service data identified by the key. When storing the received first service data, the first data service module first determines a key corresponding to the first service data; and if determining that second service data corresponding to the key is locally stored, replaces the second service data with the first service data, or if determining that second service data corresponding to the key is not locally stored, directly stores the first service data locally.

In the foregoing manner, the first data service module can determine, based on the key, whether newly received first service data is service data updated for a piece of stored service data or new service data. Therefore, the first data service module can perform combination and update processing on the stored service data. For service data with a same attribute, only a latest version of the service data needs to be stored. This avoids data redundancy and saves storage space.

In this embodiment of the present disclosure, a data service module corresponding to the active service module is the active data service module, and a data service module corresponding to the standby service module is a non-active data service module (which may also be referred to as a standby data service module in this embodiment). Each data service module receives and stores service data of a corresponding service module by using the same method as that described above.

In some embodiments of the present disclosure, the data module is an apparatus or a device that has data sending and receiving and processing capabilities, for example, may be a server, an electronic device, or a database.

Figure 3:
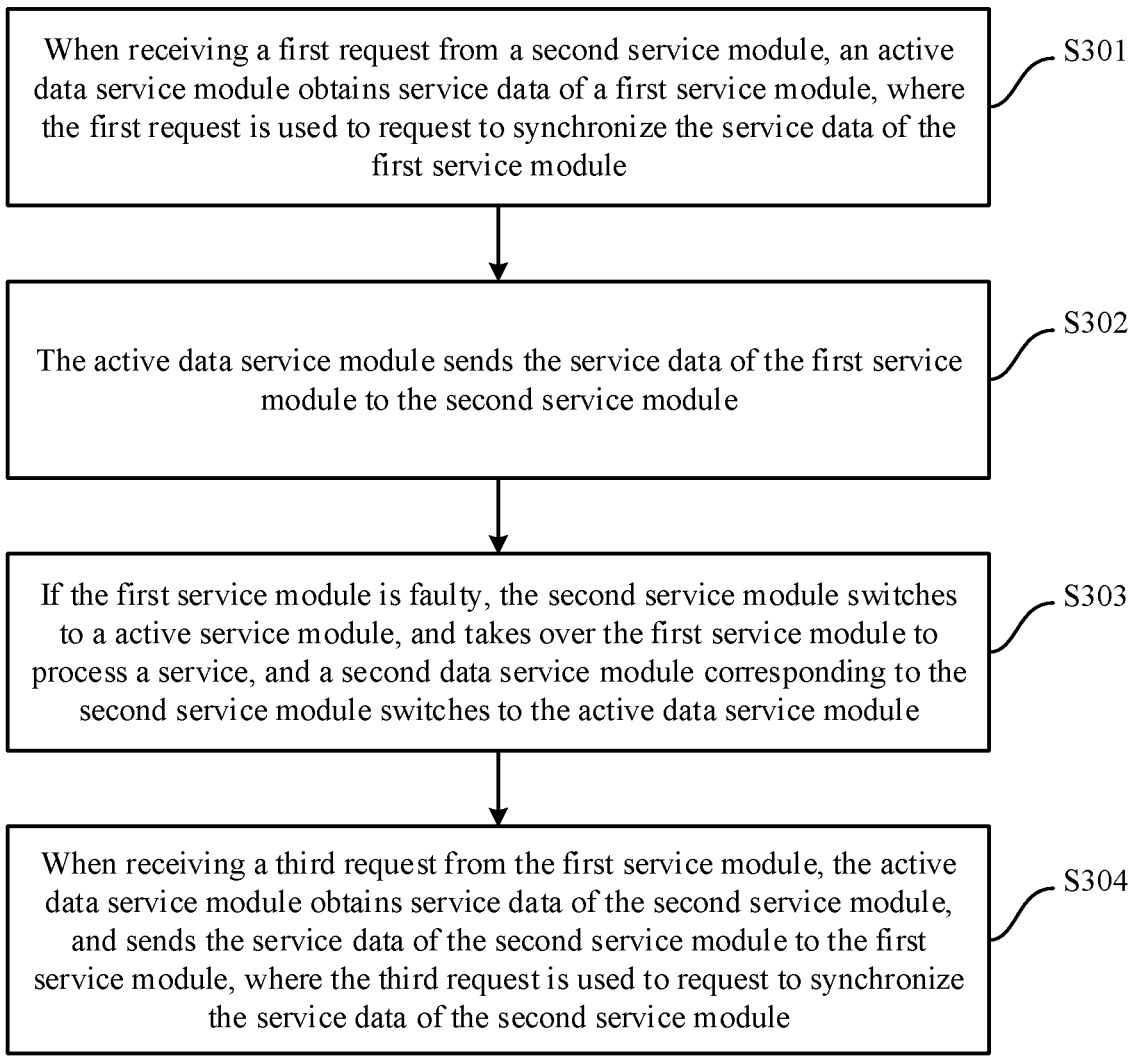
FIG. 3 is a schematic diagram of a data synchronization method according to an embodiment of the present disclosure.

FIG. 3 is a schematic diagram of a data synchronization method according to an embodiment of the present disclosure. As shown in FIG. 3, the method includes the following steps.

Step S301: When receiving a first request from a second service module, an active data service module obtains service data of a first service module, where the first request is used to request to synchronize the service data of the first service module.

The first service module is an active service module, the active data service module is a first data service module corresponding to the first service module, and the second service module is a standby service module of the first service module (the active service module).

In this embodiment of the present disclosure, the second service module is a newly online standby service module, the second service module obtains the service data of the first service module to complete data synchronization with the first service module, and after data synchronization is completed, the second service module goes online, and runs as the standby service module of the first service module.

In this embodiment of the present disclosure, the second service module can implement a function of the standby service module only after going online. When the first service module is faulty, the second service module switches to an active service module to take over the first service module to process a service. In addition, after going online, the second service module runs independently, and executes a same service processing procedure synchronously with the first service module. Therefore, after going online, the second service module does not need to synchronize the service data from the first service module.

In this embodiment of the present disclosure, when sending the service data of the first service module to the second service module, the active data service module needs to send locally stored service data of the first service module to the second service module. In addition, when the active data service module synchronizes the locally stored service data to the second service module, the first service module runs normally, and service data generated by a service during running is also sent to the active data service module in real time. Therefore, the active data service module needs to send the newly received first service data to the second service module. Real-time service data received by the active data service module may update service data in locally stored historical service data. Therefore, in this embodiment of the present disclosure, when sending the service data to the second service module, the active data service module may compare the received first service data with the locally stored service data, and send latest-version service data to the second service module.

Specifically, when receiving the first request of the second service module, the active data service module may obtain the service data of the first service module in any one of the following manners:

(1) Obtaining, based on a sequence of obtaining the service data of the first service module, the first service data corresponding to an identifier of the first service data.

For the stored service data and the newly received first service data, the active data service module sequentially reads the first service data based on a sequence of receiving the service data of the first service module, in other words, based on an identifier sequence of the service data.

The read first service data may be service data stored or received by the active data service module after a first moment, and the first moment is a moment at which the active data service module starts to locally store the received first service data from the first service module.

(2) Obtaining, based on a key included in the service data of the first service module, service data including a same key, where the service data including the same key includes the first service data; and obtaining, based on a sequence of obtaining the service data of the first service module, the first service data corresponding to the identifier of the first service data.

For the stored service data and the newly received service data from the first service module, the active data service module determines the service data including the same key. In a process of sequentially reading the first service data based on a sequence of receiving the service data of the first service module, in other words, based on an identifier sequence of the service data, for the service data including the same key, latest received first service data is obtained.

Step S302: The active data service module sends the service data of the first service module to the second service module.

After obtaining the service data of the first service module by using the foregoing method, the active data service module sends the service data of the first service module to the second service module. After receiving the service data, the second service module goes online, and works as the standby service module of the first service module.

After the second service module goes online, a standby service module of the first service module may continue to be deployed in a data synchronization system by using a same method as the foregoing method, to deploy a plurality of standby service modules for the first service module.

For example, when a third service module newly goes online in the data synchronization system, after receiving a second request from the third service module, the active data service module sends the service data of the first service module to the third service module. In this way, the third service module completes data synchronization with the first service module, and works as the standby service module of the first service module after data synchronization is completed.

When the active data service module synchronizes the service data of the first service module to the third service module, reference may be made to the foregoing method used when the active data service module synchronizes the service data of the first service module to the second service module.

In this embodiment of the present disclosure, after the first service module is faulty, the data synchronization system selects, based on service priorities of the plurality of standby service modules of the first service module, one of the standby service modules to switch to the active service module, and takes over the first service module to work. The priorities of the plurality of standby service modules may be set to priorities or priorities determined based on a set indicator parameter. This is not specifically limited in this embodiment of the present disclosure.

The first service module goes offline when the first service module is faulty, and the corresponding data service module configured to store the service data of the first service module also switches from the active data service module to a non-active data service module. It is assumed that the second service module switches to the active service module after being selected. In this case, a corresponding second data service module configured to store service data of the second service module switches from the non-active data service module to the active data service module. After switching to the active data service module, the second data service module has a capability of publishing data externally, and is configured to synchronize the service data to another newly online standby service module.

If an occurred fault that can be rectified by the first service module, the first service module may be used as the standby service module to go online again. When the first service module goes online again, the active service module is the second service module, the first service module is a standby service module of the second service module, and the service data of the second service module needs to be synchronized.

Based on this, the data synchronization method may further include the following steps.

Step S303: If the first service module is faulty, the second service module switches to the active service module, and takes over the first service module to process the service, and the second data service module corresponding to the second service module switches to the active data service module.

Step S304: When receiving a third request from the first service module, the active data service module obtains the service data of the second service module, and sends the service data of the second service module to the first service module, where the third request is used to request to synchronize the service data of the second service module.

In this embodiment of the present disclosure, the active data service module is the data service module corresponding to the second service module, and the data service module corresponding to the second service module serves as the active data service module after the first service module is faulty, and provides a DSS for the standby service modules. After the fault is rectified by the first service module, the first service module can normally provide service processing. In this case, the first service module may serve as a backup of the second service module and request corresponding service data from the data service module corresponding to the second service module.

During specific implementation, when receiving the third request of the first service module, the active data service module obtains the service data of the second service module by using a method the same as that for obtaining the service data of the first service module. When obtaining the service data of the second service module, the active data service module obtains service data stored or received by the active data service module after a second moment, where the second moment is a moment when the first service module is faulty.

In some embodiments of the present disclosure, the first service module may add the second moment to the third request sent to the active data service module, the active data service module determines a moment at which the second service module switches to the active service module as the second moment, or the active data service module determines a moment at which the active data service module switches from the non-active data service module to the active data service module as the second moment.

For a method used when the active data service module sends the service data of the second service module to the first service module, refer to the method in which the active data service module sends the service data in step S302. After the active data service module sends the service data of the second service module to the first service module by using the foregoing method, the first service module goes online, and works as the standby service module of the second service module.

In the foregoing embodiment of the present disclosure, the plurality of standby service modules is deployed for the active service module. This implements redundancy backup, improves a system fault tolerance rate, and reduces a service loss caused by a fault. Therefore, a fault protection capability is relatively strong. In addition, the independent active data service module is used to replace the active service module to synchronize the data for the plurality of standby service modules. This does not occupy resources of the active service module, and ensures normal service processing performance of the active service module.

The first moment, the second moment, or a moment mentioned in this embodiment of the present disclosure refers to a time point.

Embodiment 1

The following describes deployment manners of different service modules and different data service modules in the embodiments of the present disclosure.

The active service module is an active program deployed on a control plane, and the standby service module is a standby program of the active program.

Specifically, a DSS module instantiates, for each application (including the active program and a plurality of standby programs), a data service module for storing service data, and n (n is a positive integer) applications corresponds to n data service modules. Each application corresponds to each data service module, and each data service module stores service data of an application corresponding to the data service module. Each application (also referred to as a copy program) and each data service module may be deployed in a manner described in any one of the following examples.

Example 1: Affinity Deployment Manner

Figure 4:
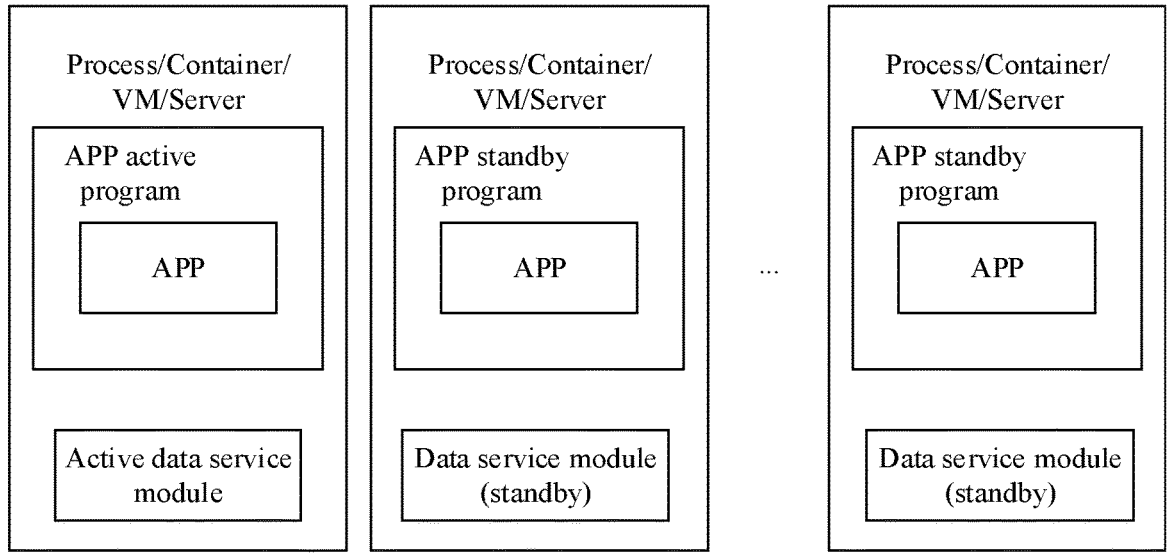
FIG. 4 is a schematic diagram of an affinity deployment manner of a DSS module according to an embodiment of the present disclosure.

FIG. 4 is a schematic diagram of an affinity deployment manner of a DSS module according to an embodiment of the present disclosure. As shown in FIG. 4, in this manner, programs in a routing system and corresponding data service modules are deployed in a same process, container, VM, or server, and programs and data service modules in different combinations are separately deployed in different processes, containers, VMs, or servers. In the foregoing deployment manner, each program and a data service module corresponding to the program are deployed in a separate object. This can improve throughput performance and real-time performance when a program writes data to a data service module. In addition, when any program, data service module or object is faulty, normal running of another program is not affected. Therefore, fault tolerance of the routing system is relatively high. The object mentioned in this embodiment of the present disclosure may be a process, a container, a VM, or a server.

Example 2: Independent Deployment Manner

Figure 5:
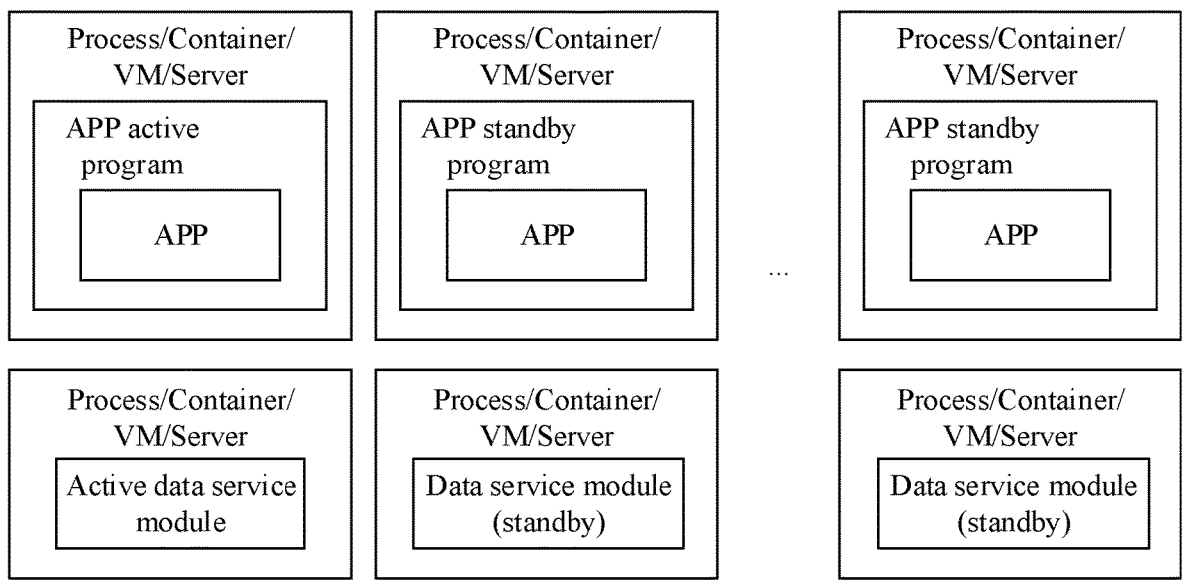
FIG. 5 is a schematic diagram of an independent deployment manner of a DSS module according to an embodiment of the present disclosure.

FIG. 5 is a schematic diagram of an independent deployment manner of a DSS module according to an embodiment of the present disclosure. As shown in FIG. 5, in this manner, programs in a routing system and corresponding data service modules are separately deployed in different processes, containers, VMs, or servers, and different programs and data service modules are separately deployed in different processes, containers, VMs, or servers. In the foregoing deployment manner, each program and data service module corresponding to the program are separately deployed in different objects. When the program is faulty, the corresponding data service module only needs to delete service data of the program, and does not need to restart the program for recovery. In addition, when any program or data service module or object is faulty, normal running of another object is not affected. Therefore, this further improves fault tolerance of the routing system.

Example 3: Many-to-One Deployment Manner

Figure 6:
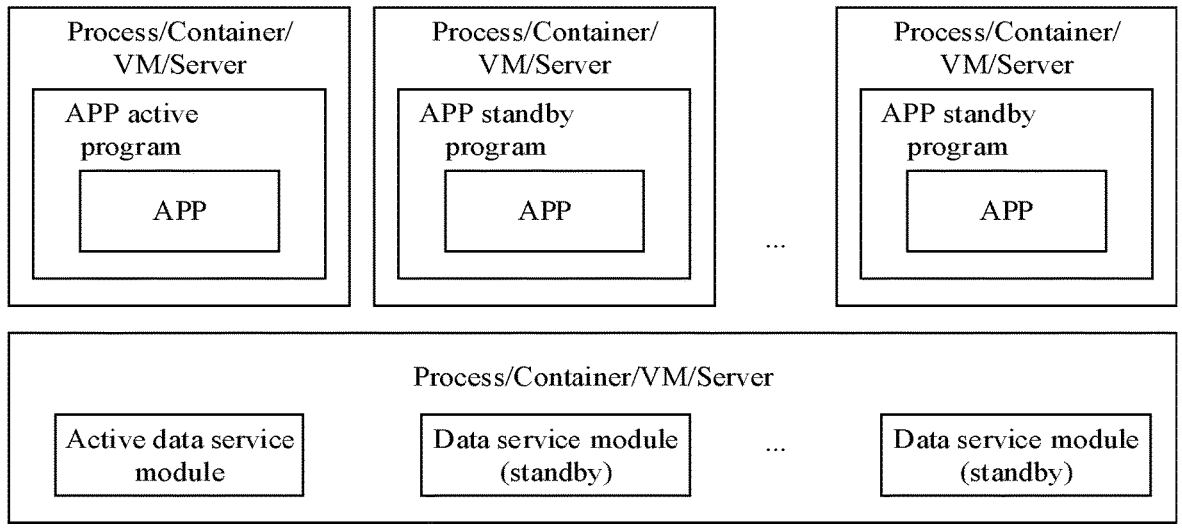
FIG. 6 is a schematic diagram of a many-to-one deployment manner of a DSS module according to an embodiment of the present disclosure.

FIG. 6 is a schematic diagram of a many-to-one deployment manner of a DSS module according to an embodiment of the present disclosure. As shown in FIG. 6, in this manner, different programs in a routing system are separately deployed in different processes, containers, VMs, or servers, and data service modules corresponding to the programs are uniformly deployed in a same process, container, VM, or server. In the foregoing deployment manner, the data service modules corresponding to the programs are deployed in a same object. This reduces resources occupied by the routing system, and avoids resource waste.

Example 4: Another Many-to-One Deployment Manner

Figure 7:
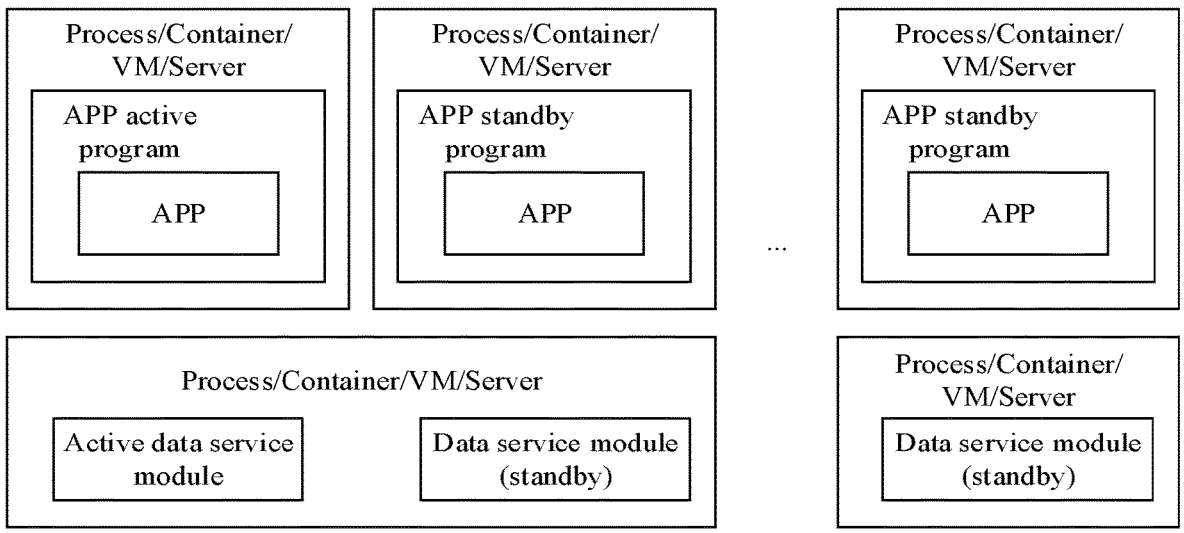
FIG. 7 is a schematic diagram of another many-to-one deployment manner of a DSS module according to an embodiment of the present disclosure.

FIG. 7 is a schematic diagram of another many-to-one deployment manner of a DSS module according to an embodiment of the present disclosure. As shown in FIG. 7, in this manner, different programs of a routing system are separately deployed in different processes, containers, VMs, or servers, and data service modules corresponding to a plurality of programs may be deployed in a same process, container, VM, or server. In the foregoing deployment manner, data service modules corresponding to some programs are deployed in a same object, which can reduce resource occupation and avoid resource waste. In addition, there are data service modules deployed in different objects, and this can improve fault tolerance performance.

The foregoing examples are examples of deployment manners of a service module and a data service module that may be used in the embodiments of the present disclosure. In actual implementation, a specific deployment manner of the service module and the data service module may be flexibly adjusted based on an actual requirement.

Embodiment 2

The following describes a data storage method for a service module in this embodiment of the present disclosure with reference to specific examples. The following describes a data storage method of each program in a routing system by using the deployment manners described in Example 1 of Embodiment 1. For a data storage method in another deployment manner provided in this embodiment of the present disclosure, refer to the following content. Details are not described one by one.

Figure 8:
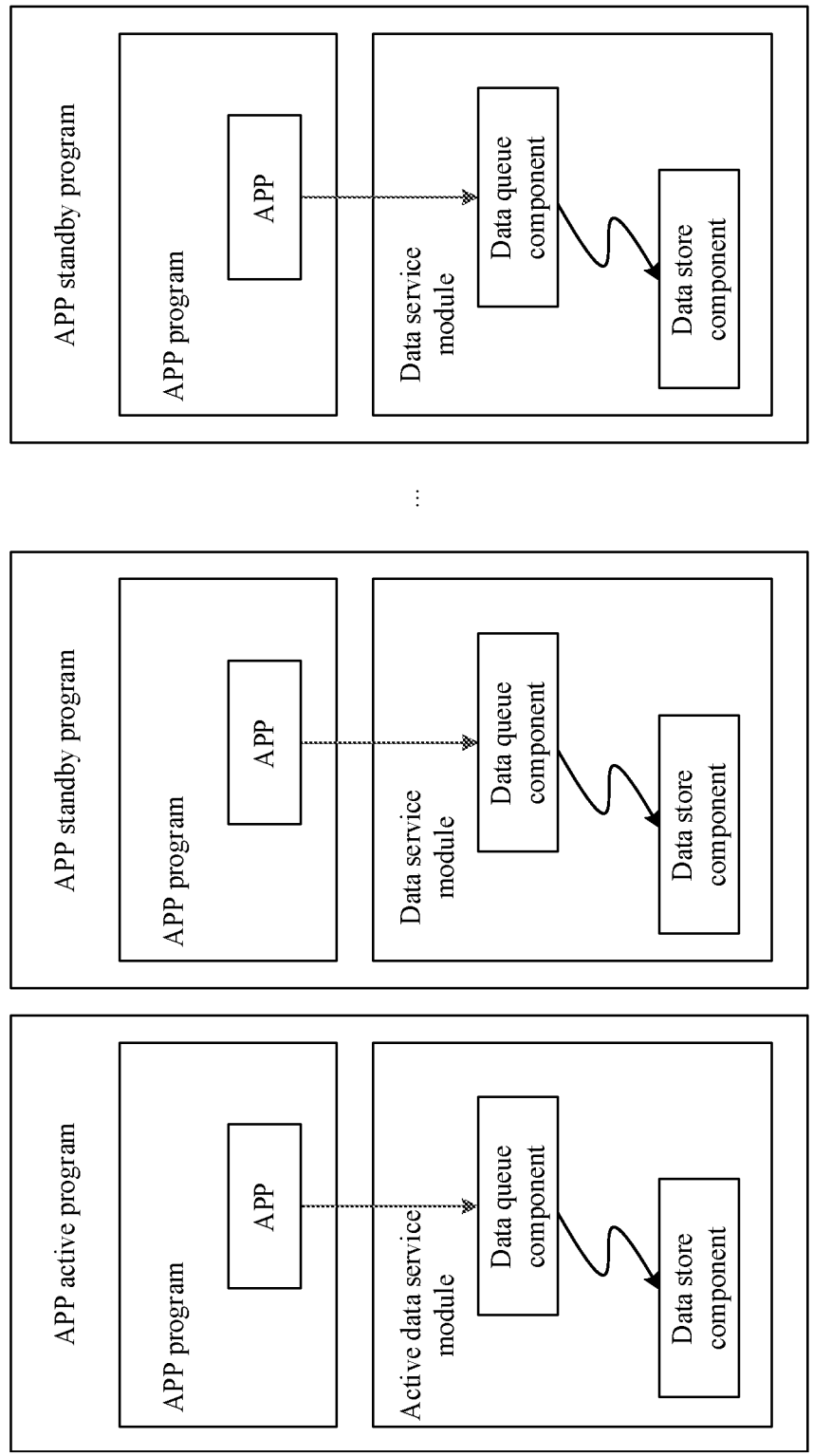
FIG. 8 is a schematic diagram of a data storage method according to an embodiment of the present disclosure.

FIG. 8 is a schematic diagram of a data storage method according to an embodiment of the present disclosure. As shown in FIG. 8, each data service module includes a data queue (queue) component and a data store (data store) component. The data queue component provides a first-in first-out queue, and is configured to receive service data sent by a corresponding program. The data queue component has at least one of a data publishing capability and a data subscription capability, and another program may read the service data from the queue. The data queue component further supports to provide a plurality of data queues, and a user may set data queues to which various types of service data belong. The data store component is configured to store service data, and may use storage forms such as a database, a file, or a data structure. The data store component sequentially reads the service data from the data queue component and stores the service data. The components mentioned in this embodiment of the present disclosure may be units, modules, or other possible software or hardware structures. This is not limited in this embodiment of the present disclosure.

In some embodiments of the present disclosure, the service data stored by the data store component includes a key (key). The key may be route information, route neighbor information, or the like. This is not limited in this embodiment of the present disclosure. Based on the key, when storing the service data, the data storage component can perform operations such as combination and update on service data having a same key. Therefore, for a same service data, a latest version of the service data can be stored.

Figure 9:
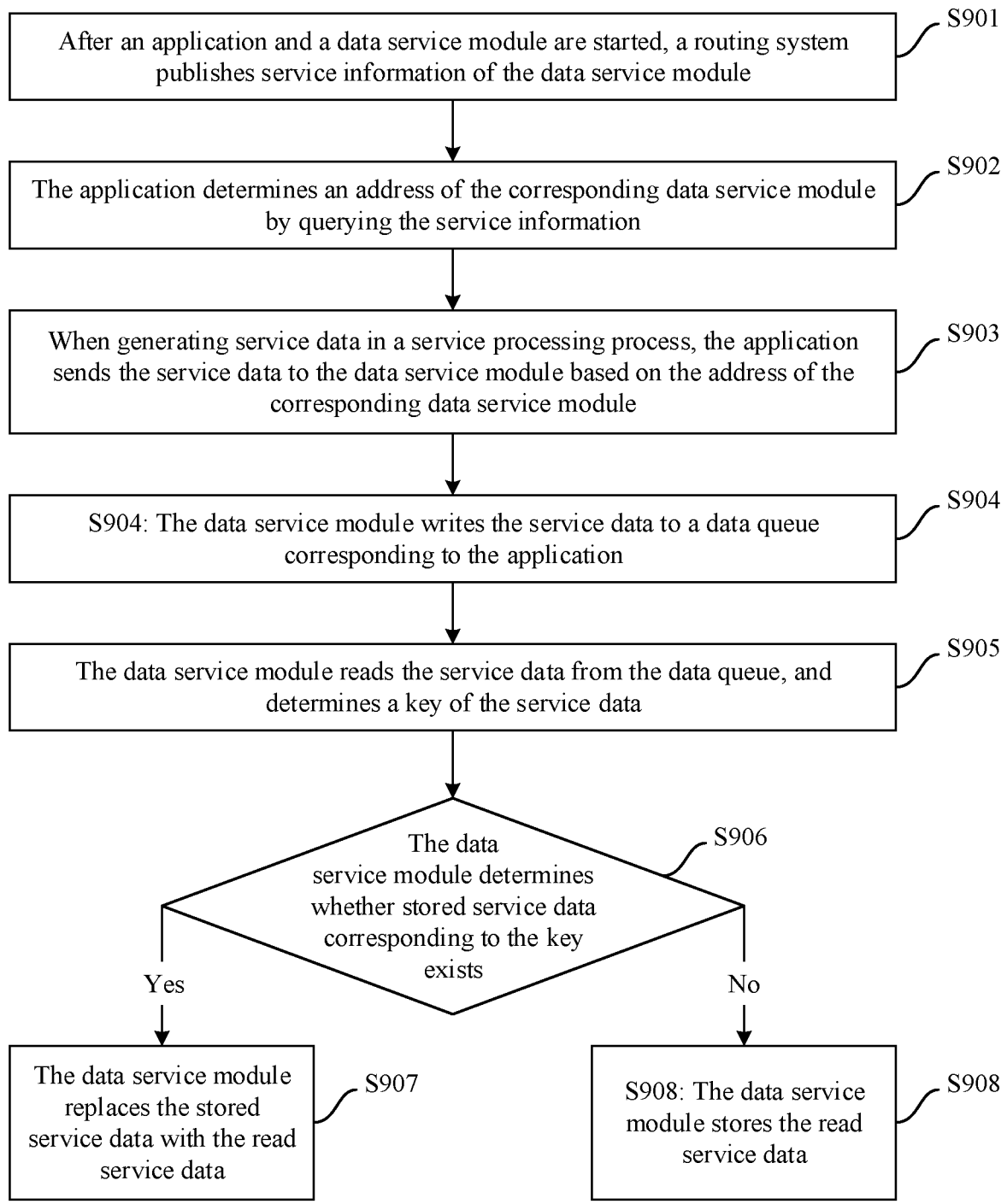
FIG. 9 is a schematic flowchart of storing service data by a data service module according to an embodiment of the present disclosure.

FIG. 9 is a schematic flowchart of storing service data by a data service module according to an embodiment of the present disclosure. As shown in FIG. 9, a procedure includes the following steps.

Step S901: After an application and a data service module are started, a routing system publishes service information of the data service module.

The application includes an active program and a standby program, and the service information includes an address of the data service module. The routing system may be a system to which the active program and the data service module corresponding to the active program belong.

Step S902: The application determines the address of the corresponding data service module by querying the service information.

Step S903: When generating service data in a service processing process, the application sends the service data to the data service module based on the address of the corresponding data service module.

Step S904: The data service module writes the service data to a data queue corresponding to the application.

This step is completed by a data queue component in the data service module.

Optionally, when writing the service data into the data queue, the data queue component in the data service module generates a version number of the service data based on a time sequence of receiving the service data and an ascending order of version numbers.

Step S905: The data service module reads the service data from the data queue, and determines a key of the service data.

Step S906: The data service module determines whether stored service data corresponding to the key exists; and if the stored service data corresponding to the key exists, performs step S907, and if no stored service data corresponding to the key exists, performs step S908.

Step S907: The data service module replaces the stored service data with the read service data.

Step S908: The data service module stores the read service data.

The foregoing steps S905 to S908 are completed by a data store component in the data service module.

In the foregoing embodiment, in a manner of storing the service data of the application, the data service module can store the service data sequentially, and can update the stored service data in real time in a storage process, to delete useless old-version data. Therefore, this can use resources properly, and save storage space.

Embodiment 3

Figure 10:
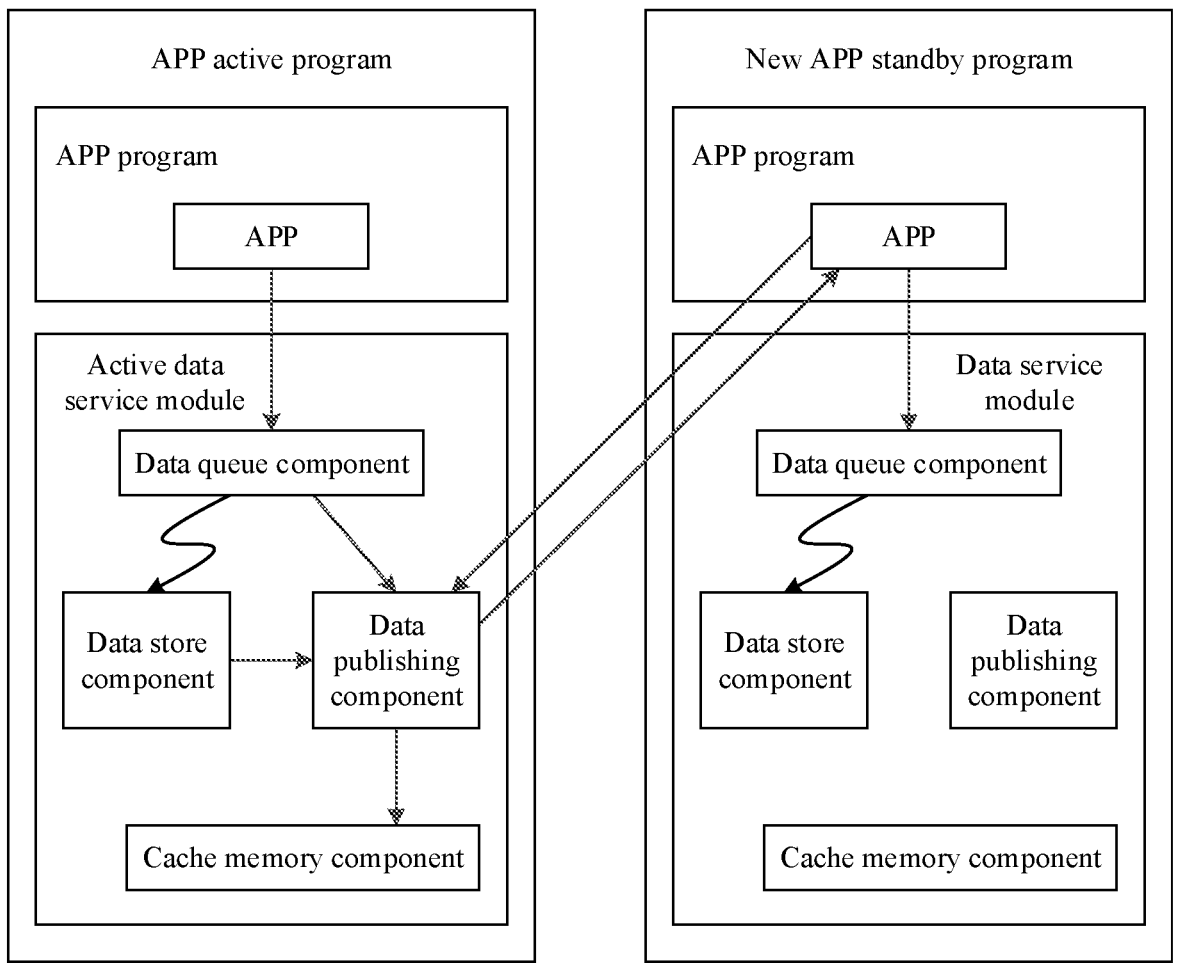
FIG. 10 is a schematic diagram of a data synchronization method according to an embodiment of the present disclosure.

The following describes the data synchronization method provided in this embodiment of the present disclosure with reference to specific examples. FIG. 10 is a schematic diagram of a data synchronization method according to an embodiment of the present disclosure. As shown in FIG. 10, based on the foregoing Embodiment 2, each data service module further includes a data publisher component and a cache component.

In some embodiments of the present disclosure, each time the data queue component of each data service module receives a piece of service data, a version number is generated for the service data, where the version number is used to compare new-version and old-version service data. When a data store component reads and stores the service data from a data queue component, the cache component also stores the version number of the service data. The data queue component generates a version number for received service data based on a time sequence of receiving the service data and an ascending order of version numbers. Therefore, service data in one data queue shares one version number space.

A data publishing component of an active data service module is configured to read service data of an active program from the data queue component and the data store component, and send a latest-version data to a standby program by querying new and old versions of the service data from the cache component.

The cache component compares the new and old versions of the service data based on the stored version number of the service data. Specifically, when the store component stores the service data, the cache component also stores the version number of the service data, and the cache component obtains real-time service data from the data queue component, and obtains historical service data from the data store component. The data store component also obtains the real-time service data from the data queue component, and stores the real-time service data or updates stored historical service data. After obtaining the service data from the data queue component and the data store component, the cache component compares version numbers of service data with a same key, and uses service data with a larger version number as new-version service data, and the data publishing component sends the new-version service data to the standby program.

The following describes the data synchronization method provided in this embodiment of the present disclosure by using an example in which an original active program is restarted and switches to a new standby program after going offline due to a fault.

In some embodiments of the present disclosure, the active program goes offline after being faulty, one of a plurality of standby programs of the active program switches to a new active program, and a data service module corresponding to the standby program switches to a new active data service module. If the original active program can rectify an occurred fault, the original active program can go online again after the fault is rectified. After the original active program goes offline, a standby program switches to a new active program to take over the original active program to process a service. Therefore, the original active program goes online again as a standby program of the new active program. The original active program synchronizes service data from an active data service module corresponding to the new active program.

Figure 11:
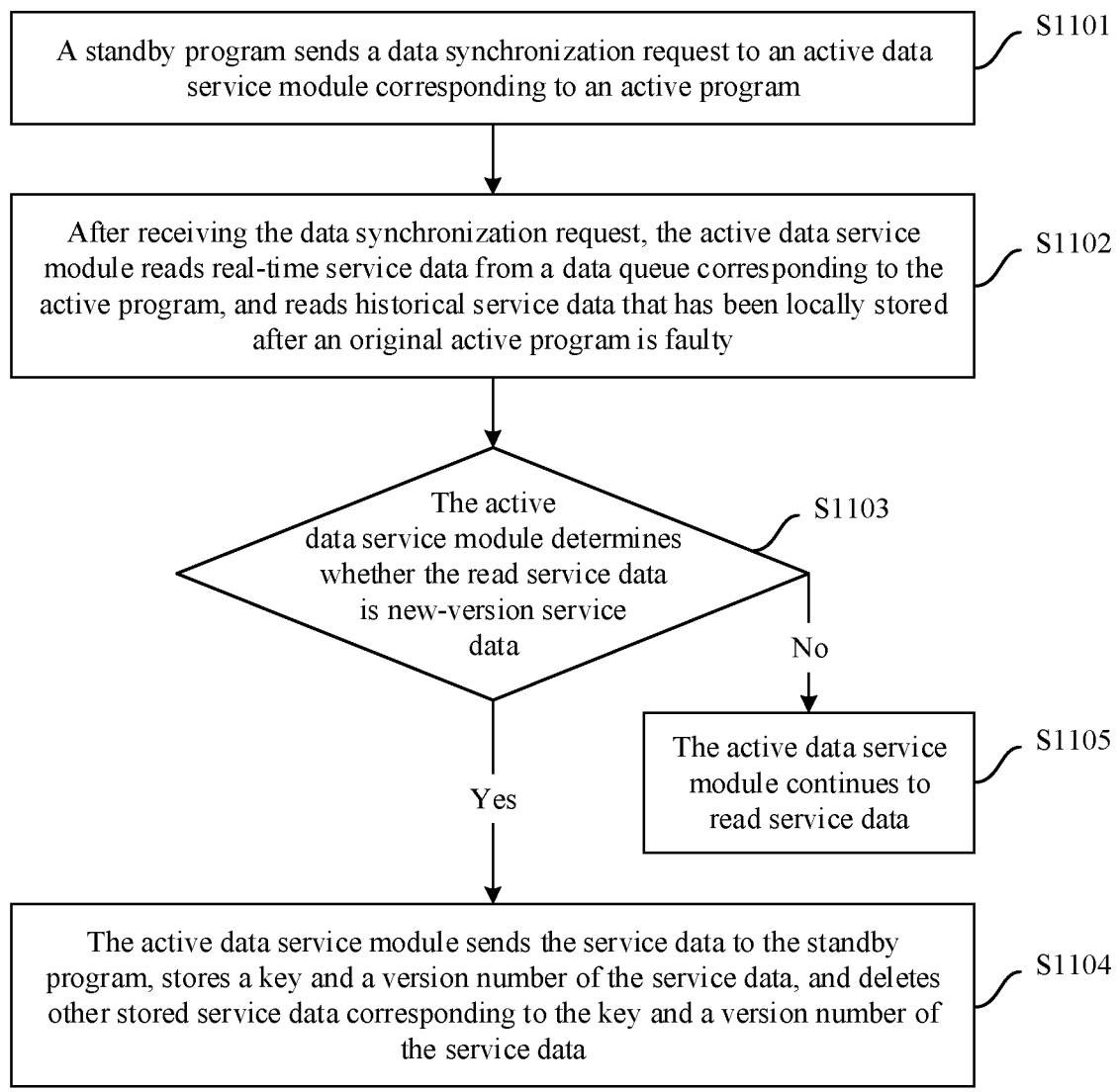
FIG. 11 is a schematic flowchart of a data synchronization method according to an embodiment of the present disclosure.

FIG. 11 is a schematic flowchart of a data synchronization method according to an embodiment of the present disclosure. As shown in FIG. 11, a procedure includes the following steps.

Step S1101: A standby program sends a data synchronization request to an active data service module corresponding to an active program.

The active program originally is a standby program, and switches to the active program only after an original active program is faulty. The standby program originally is an active program, stops a service after a fault occurs, and switches to the standby program after the fault is rectified by restarting. The standby program requests, from the active data service module by using the data synchronization request, new-version service data generated by the active program after the original active program is faulty.

Step S1102: After receiving the data synchronization request, the active data service module reads real-time service data and historical service data from a data queue corresponding to the active program.

This step is completed by a data publishing component in the active data service module. The data publishing component reads the historical service data from a data store component.

Step S1103: The active data service module determines whether the read service data is the new-version service data. If the read service data is the new-version service data, step S1104 is performed; and if the read service data is not the new-version service data, step S1105 is performed.

This step is completed by a cache component in the active data service module.

In this embodiment, the cache component determines new and old versions of the service data by comparing version numbers of different service data corresponding to a same key. After the active data service module receives the data synchronization request, the cache component first determines a version number of service data stored by the data store component when the original active program is faulty, and uses the version number as a reference version number. After the data publishing component reads the real-time service data and the historical service data, the cache component compares a version number of each read service data with the reference version number; and if the version number is greater than the reference version number, determines that the service data is the new-version service data, and if the version number is not greater than the reference version number, determines that the service data is old-version service data. If service data whose key is the same as that of the read service data exists, service data whose version number is largest is determined as the new-version data, and service data whose version number is not largest is determined as the old-version data.

Step S1104: The active data service module sends the service data to the backup program, stores a key and a version number of the service data, and deletes other stored service data corresponding to the key and a version number of the service data.

After the cache component determines the new-version data, the data publishing component sends the new-version data to the standby program.

Step S1105: The active data service module continues to read service data.

In this embodiment, the active data service module reads the historical service data and repeatedly performs the foregoing steps S1103 to S1105.

In the foregoing embodiment, after the original active program is faulty, the original active program may go online again as a new standby program. In this case, when synchronizing data, the standby program needs synchronize data after the original active program is faulty. Therefore, this can accelerate a data synchronization speed, and reduce data synchronization time. In addition, the active program needs to send generated data to the active data service module, which has little impact on performance of the active program.

Embodiment 4

The following describes the data synchronization method provided in this embodiment of the present disclosure with reference to specific examples.

As shown in FIG. 10, based on the structure of the data service module in Embodiment 3, when the standby program is a newly deployed standby program, the standby program needs to synchronize all new-version service data of the active program to go online. In addition, when the newly deployed standby program goes online, the active program runs normally, and a service during running may continuously generate data changes. Therefore, the active data service module needs to send latest versions of real-time data and historical data to the standby program.

Figure 12:
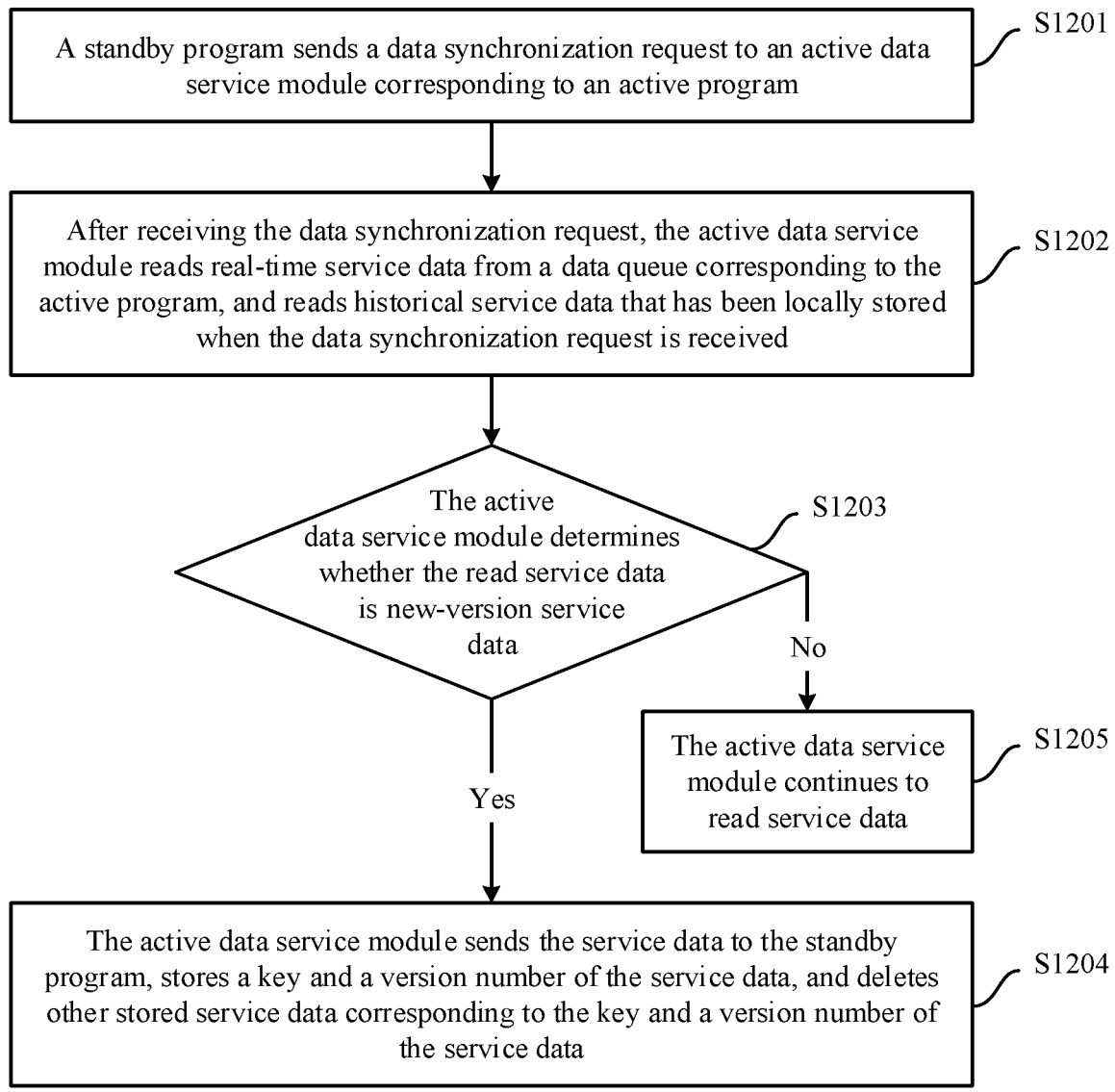
FIG. 12 is a schematic flowchart of a data synchronization method according to an embodiment of the present disclosure.

FIG. 12 is a schematic flowchart of a data synchronization method according to an embodiment of the present disclosure. As shown in FIG. 12, a procedure includes the following steps.

Step S1201: A standby program sends a data synchronization request to an active data service module corresponding to an active program.

The standby program is a newly deployed standby program, and the standby program requests, from the active data service module by using the data synchronization request, new-version service data generated by the active program.

Step S1202: After receiving the data synchronization request, the active data service module reads real-time service data from a data queue corresponding to the active program, and reads historical service data that has been locally stored when the data synchronization request is received.

This step is completed by a data publishing component in the active data service module. The data publishing component reads the historical service data from a data store component.

Step S1203: The active data service module determines whether the read service data is the new-version service data. If the read service data is the new-version data, step S1204 is performed; and if the read service data is not the new-version data, step S1205 is performed.

This step is completed by a cache component in the active data service module.

In this embodiment, the cache component determines new-version data and old-version data by comparing version numbers of different service data of a same key. After the data publishing component reads the real-time service data and the historical service data, the cache component determines whether service data whose key is the same as that of the read service data exists; and if the service data whose key is the same as that of the read service data exists, determines service data whose version number is largest and that is in the service data whose key is the same as the new-version data, and determines service data whose version number is not largest as the old-version data; and if no service data whose key is the same as that of the read service data exists, determines the read service data as the new-version data.

When the data publishing component reads the real-time service data from the data queue, if the cache component determines that a version number of the real-time service data is greater than a largest version number in all stored service data, the cache component can determine that version numbers of real-time data subsequently read by the data publishing component are all greater than the largest version number. Therefore, the real-time service data subsequently read by the data publishing component is all the new-version service data. In this case, after reading the real-time service data, the data publishing component may directly send the service data to the standby program, and the cache component does not need to compare the version numbers to determine the new-version data and the old-version data. In addition, the cache component may delete information of a version number that is less than the largest version number in stored version numbers. This can release a part of space for storing the version numbers.

Step S1204: The active data service module sends the service data to the standby program, stores a key and a version number of the service data, and deletes other stored service data corresponding to the key and a version number of the service data.

After the cache component determines the new-version data, the data publishing component sends the new-version data to the standby program.

Step S1205: The active data service module continues to read service data.

In this embodiment, when reading the historical service data, the active data service module may sequentially read the historical service data based on a set sequence, for example, in an ascending order of the version numbers, and repeatedly perform the foregoing steps S1103 to S1105 until service data stored when the data synchronization request is received is read.

In an implementation, when reading the historical service data, the active data service module may further sequentially read locally stored historical service data based on a field arrangement sequence of keys. For example, the historical service data may be sequentially read in a sequence of a pinyin initial letter of the key from A to Z until a last piece of the stored service data whose pinyin initial letter of a key is Z is read.

In the foregoing embodiment, when the newly deployed standby program goes online, the active data service module synchronizes data for the newly deployed standby program. Therefore, the active program needs to send generated data to the active data service module. In addition to synchronizing data of the active program to the newly online standby program, this greatly reduces a load of the active program, and further ensures that a service of the active program is not affected.

Figure 13:
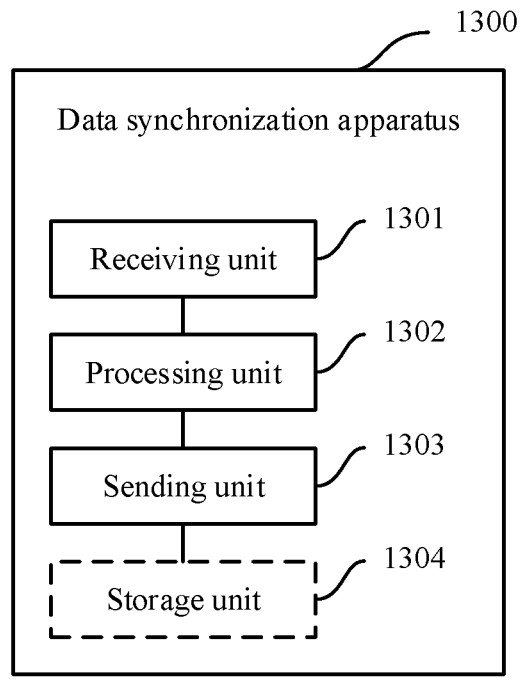
FIG. 13 is a schematic diagram of a data synchronization apparatus according to an embodiment of the present disclosure.

Based on the foregoing embodiments, an embodiment of the present disclosure further provides a data synchronization apparatus. The data synchronization apparatus may be applied to an active data service module provided in this embodiment of the present disclosure. As shown in FIG. 13, the data synchronization apparatus 1300 includes:

a receiving unit 1301, configured to receive a first request from a second service module, where the first request is used to request to synchronize service data of a first service module;

a processing unit 1302, configured to obtain the service data of the first service module; and a sending unit 1303, configured to send the service data of the first service module to the second service module.

In a possible design, the receiving unit 1301 is further configured to receive a second request from a third service module, where the second request is used to request to synchronize the service data of the first service module. The sending unit 1303 is further configured to send the service data of the first service module to the third service module.

In a possible design, the second service module switches to an active service module, and the receiving unit 1301 is further configured to receive a third request from the first service module, where the third request is used to request to synchronize service data of the second service module. The processing unit 1302 is further configured to obtain the service data of the second service module. The sending unit 1303 is further configured to send the service data of the second service module to the first service module.

In a possible design, before obtaining the service data of the first service module, the processing unit 1302 is further configured to obtain first service data and an identifier of the first service data, where the identifier of the first service data is used to indicate a sequence of obtaining the first service data, and the first service data is the service data of the first service module; and store the first service data and the identifier of the first service data.

In a possible design, before obtaining the service data of the first service module, the processing unit 1302 is further configured to obtain second service data and an identifier of the second service data, where the identifier of the second service data is used to indicate a sequence of obtaining the second service data; store the second service data and the identifier of the second service data; obtain first service data and an identifier of the first service data, where the identifier of the first service data is used to indicate a sequence of obtaining the first service data, the first service data is obtained later than the second service data, and both the first service data and the second service data are the service data of the first service module; and store the first service data and the identifier of the first service data.

In a possible design, when obtaining the service data of the first service module, the processing unit 1302 is specifically configured to obtain, based on a sequence of obtaining the service data of the first service module, the first service data corresponding to the identifier of the first service data.

In a possible design, when obtaining the service data of the first service module, the processing unit 1302 is specifically configured to obtain, based on a key included in the service data of the first service module, service data including a same key, where the service data including the same key includes the first service data; and obtain, based on a sequence of obtaining the service data of the first service module, the first service data corresponding to the identifier of the first service data.

In a possible design, the first service module corresponds to a first data service module in which the apparatus is located, and the first service module and the first data service module are deployed in a same object; or the first service module corresponds to a first data service module in which the apparatus is located, and the first service module and the first data service module are deployed in different objects.

In a possible design, the first service module corresponds to a first data service module in which the apparatus is located, and the first data service module and a data service module corresponding to the second service module are deployed in a same object; or the first service module corresponds to a first data service module in which the apparatus is located, and the first data service module and a data service module corresponding to the second service module are deployed in different objects.

In a possible design, the object includes an application process, a container, a virtual machine, a server, or an electronic device.

In an implementation, the data synchronization apparatus 1300 may further include a storage unit 1304, configured to store program code and data of the data synchronization apparatus 1300. The processing unit 1302 may be a processor or a controller, for example, a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various example logical blocks, modules, and the like described with reference to content disclosed in the present disclosure. Alternatively, the processor may be a combination of processors implementing a computing function, for example, a combination of one or more microprocessors, or a combination of the DSP and a microprocessor. The storage unit 1304 may be, for example, a memory. The receiving unit 1301 and the sending unit 1303 may be interface circuits of the apparatus, and are configured to receive a signal from another apparatus. For example, when the apparatus is implemented in a form of a chip, the receiving unit 1301 is an interface circuit used by the chip to receive a signal from another chip or apparatus, or the sending unit 1303 is an interface circuit used by the chip to send a signal to another chip or apparatus.

In this embodiment of the present disclosure, division into the units is an example, and is merely logical function division, and may be other division in actual implementation. In addition, function units in this embodiment of the present disclosure may be integrated into one processor, may exist alone physically, or two or more units may be integrated into one unit. The integrated unit may be implemented in a form of hardware, or may be implemented in a form of a software functional unit.

Only one or more of the units in FIG. 13 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

Figure 14:
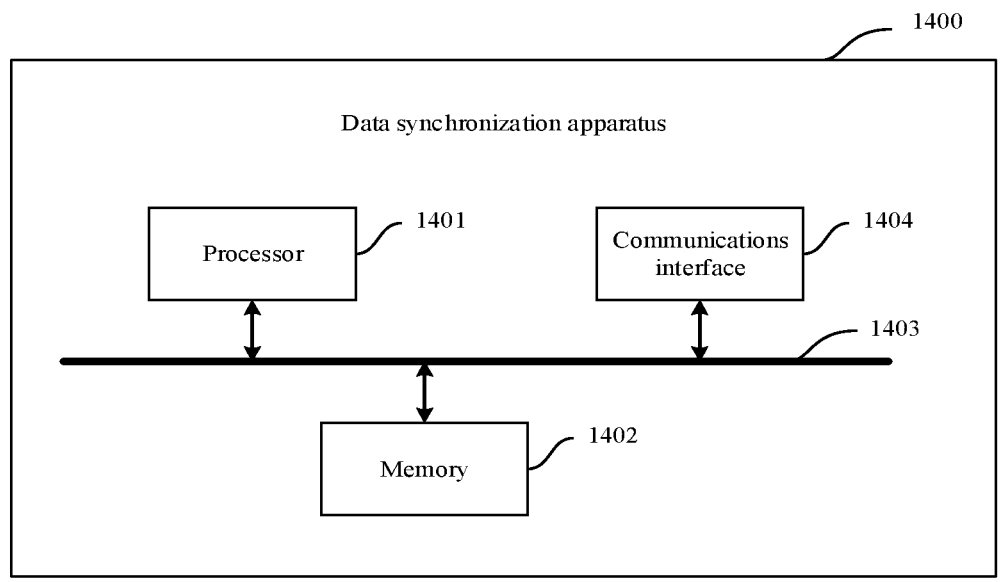
FIG. 14 is a schematic diagram of a data synchronization apparatus according to an embodiment of the present disclosure.

Based on the foregoing embodiments, an embodiment of the present disclosure further provides a data synchronization apparatus, configured to implement the data synchronization method provided in the embodiments of the present disclosure. As shown in FIG. 14, the data synchronization apparatus 1400 may include one or more processors 1401, a memory 1402, and one or more computer programs (not shown in the figure). In an implementation, the foregoing components may be coupled through one or more communications lines 1403. The memory 1402 stores one or more computer programs, and the one or more computer programs include instructions. The processor 1401 invokes the instructions stored in the memory 1402, so that the data synchronization apparatus 1400 performs the data synchronization method provided in this embodiment of the present disclosure.

In this embodiment of the present disclosure, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of the present disclosure. The general-purpose processor may be a microprocessor, any conventional processor, or the like. The steps of the methods disclosed with reference to the embodiments of the present disclosure may be directly performed and accomplished by using a hardware processor, or may be performed and accomplished by using a combination of hardware and software modules in the processor.

In the embodiments of the present disclosure, the memory may be a non-volatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in the embodiments of the present disclosure may alternatively be a circuit or any other apparatus that can implement a storage function, and is configured to store the program instructions and/or the data.

In an implementation, the data synchronization apparatus 1400 may further include a communications interface 1404, configured to communicate with another apparatus by using a transmission medium. In this embodiment of the present disclosure, the communications interface may be a transceiver, a circuit, a bus, a module, or a communications interface of another type. In this embodiment of the present disclosure, when the communications interface is a transceiver, the transceiver may include an independent receiver and an independent transmitter, or may be a transceiver integrated with a transceiver function, an interface circuit, or the like.

In some embodiments of the present disclosure, the processor 1401, the memory 1402, and the communications interface 1404 may be connected to each other through the communications line 1403. The communications line 1403 may be a peripheral component interconnect standard (PCI) bus, an extended industry standard architecture (EISA) bus, or the like. The communications line 1403 may be classified into an address bus, a data bus, a control bus, and the like. For ease of representation, only one thick line is used to represent the bus in FIG. 14, but this does not mean that there is only one bus or only one type of bus.

An embodiment of the present disclosure further includes a system. The system includes the data synchronization apparatus 1300 or the data synchronization apparatus 1400.

All or some of the methods in the embodiments of the present disclosure may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments are generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clearly that a person skilled in the art can make various modifications and variations to the present disclosure without departing from the scope of the present disclosure. The present disclosure is intended to cover these modifications and variations of the present disclosure provided that they fall within the scope of protection defined by the following claims and their equivalent technologies.

In this embodiment of the present disclosure, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following" or similar expressions indicate any combination of the following, including any combination of one or more of the following. For example, at least one of a, b, or c may represent: a, b, c, a and b, a and c, b and c, or a, b, and c, and a, b, and c may be singular or plural.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer usable program code.

The present disclosure is described with reference to the flowcharts and/or block diagrams of the method, the device (system), and the computer program product according to the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or other programmable device, thereby generating computer-implemented processing. Therefore, the instructions executed on the computer or other programmable device provide steps for implementing a specific function in one or more processes in the flowcharts and/or in one or more blocks in the block diagrams.

In the several embodiments provided in the present disclosure, it should be understood that the disclosed apparatus and method may be implemented in other manners without departing from the scope of the present disclosure. For example, the described embodiment is merely an example. For example, division into the modules or units is merely logical function division and may be other division in an actual implementation. For example, a plurality of units or components may be combined or integrated into another system, or some features may be ignored or not performed. The units described as separate parts may or may not be physically separate, and parts displayed as units may or may not be physical units, may be located in one location, or may be distributed on a plurality of network units. Some or all of the modules may be selected based on an actual requirement to achieve the objectives of the solutions of the embodiments. A person of ordinary skill in the art may understand and implement the embodiments without creative efforts.

In addition, the apparatus and method described herein, and schematic diagrams of different embodiments can be combined or integrated with other systems, modules, technologies, or methods without departing from the scope of the present disclosure. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of the present disclosure, and are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
    receiving from a second service module of a second server a first request to synchronize first service data of a first service module of a first server;
    obtaining the first service data;
    sending the first service data to the second service module;
    receiving from a third service module of a third server a second request to synchronize the first service data; and
    sending the first service data to the third service module;
    receiving from the first service module a third request to synchronize second service data of the second service module;
    obtaining the second service data and a second identifier of the second service data, wherein the second identifier indicates a second sequence of obtaining the second service data;
    storing the second service data and the second identifier;
    obtaining, after obtaining the second service data, a first identifier of the first service data, wherein the first identifier indicates a first sequence of obtaining the first service data;
    storing the first service data and the first identifier; and
    sending the second service data to the first service module.

2. The method of claim 1, further comprising:
    storing service data using a key-value format, wherein a value is specific content of the service data identified by a key;
    obtaining a first key corresponding to the first service data; and
    obtaining the first service data based on the first key.

3. The method of claim 1, wherein prior to obtaining the first service data, the method further comprises:
    obtaining a first identifier of the first service data, wherein the first identifier indicates a sequence of obtaining the first service data; and
    storing the first identifier.

4. The method of claim 3, wherein obtaining the first service data comprises obtaining, based on the first sequence, the first service data.

5. The method of claim 3, wherein obtaining the first service data comprises:
    obtaining, based on a key comprised in service data of the first service module, second service data comprising the key, wherein the second service data comprises the first service data.

6. The method of claim 1, wherein the first service module corresponds to a first data service module, and wherein first service module and the first data service module are deployed in a same object.

7. The method of claim 6, wherein the same object comprises an application process, a container, a virtual machine, a server, or an electronic device.

8. The method of claim 1, wherein the first service module corresponds to a first data service module, and wherein the first data service module and a data service module corresponding to the second service module are deployed in a same object.

9. A data synchronization apparatus, comprising:
    a memory configured to store an instruction; and
    a processor configured to communicate with the memory, wherein the processor is configured to execute the instruction to cause the data synchronization apparatus to:
        receive from a second service module of a second server a first request to synchronize first service data of a first service module of a first server;
        obtain the first service data;
        send the first service data to the second service module;
        receive from a third service module of a third server a second request to synchronize the first service data;
        send the first service data to the third service module;
        receive from the first service module a third request to synchronize second service data of the second service module;
        obtain the second service data and a second identifier of the second service data, wherein the second identifier indicates a second sequence of obtaining the second service data;
        store the second service data and the second identifier;
        obtain, after obtaining the second service data, a first identifier of the first service data, wherein the first identifier indicates a first sequence of obtaining the first service data;
        store the first service data and the first identifier; and
        send the second service data to the first service module.

10. The data synchronization apparatus of claim 9, wherein the processor is further configured to execute the instruction to cause the data synchronization apparatus to:
    store service data using a key-value format, wherein a value is specific content of the service data identified by a key;
    obtain a first key corresponding to the first service data; and
    obtain the first service data based on the first key.

11. The data synchronization apparatus of claim 9, wherein the processor is further configured to execute the instruction to cause the data synchronization apparatus to:
    obtain a first identifier of the first service data, wherein the first identifier indicates a sequence of obtaining the first service data; and
    store the first identifier.

12. The data synchronization apparatus of claim 11, wherein the processor is configured to execute the instruction to cause the data synchronization apparatus to:
    obtain, based on the first sequence, the first service data.

13. The data synchronization apparatus of claim 11, wherein the processor is configured to execute the instruction to cause the data synchronization apparatus to:
    obtain, based on a key comprised in service data of the first service module, second service data comprising the key, wherein the second service data comprises the first service data.

14. The data synchronization apparatus of claim 9, wherein the first service module corresponds to a first data service module in which the apparatus is located, and wherein the first service module and the first data service module are deployed in a same object.

15. The data synchronization apparatus of claim 14, wherein the same object comprises an application process, a container, a virtual machine, a server, or an electronic device.

16. The data synchronization apparatus of claim 9, wherein the first service module corresponds to a first data service module in which the apparatus is located, and wherein the first data service module and a data service module corresponding to the second service module are deployed in a same object.

* * * * *